Patented June 28, 1938

2,122,124

UNITED STATES PATENT OFFICE 2,122,124

WATER-SOLUBLE CONDENSATION PRODUCTS AND A PROCESS OF PRODUCING SAME

Richard Alles, Mannheim, Germany, assignor to I. G. Farbenindustrie Aktiengesellschaft, Frankfort-on-the-Main, Germany No Drawing. Application January 22, 1937, Serial No. 121,822. In Germany January 31, 1936

8 Claims. (Cl. 149—5)

The present invention relates to water-soluble condensation products and a process of producing same.

I have found that water-soluble condensation products having good tanning action are obtained by treating lignin sulphonic acid and hydroxy compounds of the benzene series together with the addition compounds of salts of sulphurous acid and aldehydes or ketones or their derivatives, such as aldehyde or ketone alcohols or acids, preferably in the presence of an excess of the aldehydes or ketones in alkaline media. Simple phenols of the benzene series or their substitution products, for example their halogen, nitro and amino substitution products may be employed as well as their condensation products with aldehydes of low molecular weight, (preferably aldehydes containing from 1 to 3 carbon atoms in the molecule, such as formaldehyde or acetaldehyde), ketones, acetylene or sulphur. Suitable hydroxy compounds of the kind defined are for example phenol, cresols, xylenols, chlorphenols, resorcinol, dihydroxydiarylmethanes, di-(para-hydroxyphenyl)-dimethylmethane, and alkali-soluble condensation products derived from phenol and formaldehyde, acetaldehyde, acetone, acetophenone acetylene or sulphur. As addition compounds of salts of sulphurous acid and aldehydes, ketones or their derivatives may be mentioned for example those of formaldehyde, acetaldehyde, chloral, aldol, glycerine aldehyde, acetone, pyroracemic acid, grape sugar, benzaldehyde, salicyl aldehyde and acetophenone.

The reaction may be carried out with the formation of especially valuable products while employing besides the components mentioned above organic sulphonic acids including condensation products of organic sulphonic acids with low molecular aldehydes or ketones. As suitable sulphonic acids there may be mentioned in particular those of aromatic compounds, as for example benzene sulphonic acids, naphthalene sulphonic acids, anthracene sulphonic acids, phenol sulphonic acids or cresol sulphonic acids, or their condensation products with formaldehyde. Compounds which contain one or more methane sulphonic acid groups attached to aromatic nuclei containing hydroxyl groups may also be used with advantage, as for example the reaction products of formaldehyde bisulphite and dihydroxydiarylsulphones, in particular dihydroxy diphenyl sulphones, dihydroxy diaryl methanes and the like, and condensation products of formaldehyde bisulphite with suitable fossil substances, in particular those containing humic acid, as for example Kassel brown or other kinds of coal, peat and the like rich in humic acid.

The reaction components may be caused to react with each other simultaneously or in any sequence. Mixtures of different substances of the said classes may also be used.

The reaction conditions, in particular the temperature, may also be varied according to the initial materials and the products desired; generally speaking temperatures between 80° and 100° centigrade are especially suitable for carrying out the reaction, but higher temperatures are also suitable. The process may also be carried out under increased pressure.

The reaction products formed may be employed directly for tanning after acidification with inorganic or organic acids. It may, however, also be first separated by the addition of strong mineral acid and salts and used for tanning after the separation of the liquid portion.

If the preparation of the products has been carried out in the presence of calcium hydroxide, the reaction product is advantageously freed from calcium by precipitation with a mixture of sulphuric acid and ammonium sulphate and adjusted to a pH value of from 3.2 to 4.0. Products poor in ash are thus obtained.

The water-soluble products thus obtainable have good tanning action and lead to leather of great fullness and high yield. Since the products also have good stiffness, they are eminently suitable for sole-leather tanning. As regards their tanning action the products have a certain similarity to vegetable tanning agents and therefore are capable of replacing the same completely or to a far-going degree.

The products obtainable according to this invention which have been prepared in the absence of the organic sulphonic acids referred to above (or their condensation products with low molecular aldehydes or ketones) are advantageous for the preparation of underleather due to their firm tanning and stiffening properties. The products prepared in the presence of the beforementioned organic sulphonic acids are even improved in these properties. When working in the presence of organic sulphonic acids, it is possible to vary the properties of the products obtained in such a manner that they can be used for the preparation of various kinds of leather, which differ, for example, in their response to touch. These tanning agents prepared in the presence of organic sulphonic acids are furthermore superior to those prepared in the absence thereof as regards the uniformity and rapidity of through-tanning as well as the fulling action.

The following examples will further illustrate the nature of this invention but the invention is not restricted to these examples. The parts are by weight.

Example 1

200 parts of neutralized 50 per cent sulphite waste liquor are mixed with a solution of 40 parts of cresol DAB VI in 15 parts of 30 per cent caustic soda solution and 100 parts of water and then there is added a solution of 3 parts of anhydrous sodium bisulphite and 30 parts of 30 per cent formaldehyde in 100 parts of water.

The whole is heated for about 3 hours at waterbath temperature while stirring repeatedly. The reaction product is diluted with water and acidified with 30 parts of 100 per cent formic acid. A turbid brown solution is thus obtained which when used for tanning yields a yellowish white, full and compact leather.

A product having equally good tanning properties is obtained when a solution of 5 parts of anhydrous sodium bisulphite in 50 parts of 30 per cent formaldehyde solution and 100 parts of water is added to the alkaline solution of sulphite waste liquor and cresol and the reaction is carried out under the conditions above described.

Example 2

200 parts of neutralized 50 per cent sulphite waste liquor are mixed with a solution of 40 parts of di-(para-hydroxyphenyl)-dimethyl-methane in 7 parts of 30 per cent caustic soda solution and 100 parts of water; a solution of 5 parts of anhydrous sodium bisulphite in 30 parts of 30 per cent formaldehyde solution and 100 parts of water is then added and the whole heated to 90° centigrade for three hours while stirring repeatedly.

The reaction product obtained is separated from the solution by the addition of concentrated hydrochloric acid. The resinous product separated from the hydrochloric acid solution yields a yellowish pale grey leather of especially good fullness and compact standing.

If a solution of 40 parts of a phenol-acetaldehyde condensation product in 20 parts of 30 per cent caustic soda solution and 100 parts of water be employed instead of the di-(para-hydroxyphenyl)-dimethyl-methane solution, a product having good tanning properties is also obtained.

Example 3

200 parts of neutralized sulphite cellulose waste liquor are mixed with a solution of 20 parts of resorcinol in 20 parts of 30 per cent caustic soda solution and 100 parts of water; a solution of 15 parts of anhydrous sodium bisulphite in 30 parts of 30 per cent formaldehyde solution and 100 parts of water is then added. The whole is heated for three hours at 90° centigrade, the evaporated water is replenished, a further 30 parts of 30 per cent formaldehyde solution is added while stirring and the whole heated for a further two hours. The reaction product is diluted with water and acidified with 30 parts of formic acid. A clear syrupy solution is thus obtained which yields a reddish pale grey leather having a very good stiffness.

Example 4

200 parts of neutralized sulphite waste liquor are mixed with a solution of 40 parts of di-(para-hydroxyphenyl)-dimethyl-methane in 17 parts of 30 per cent caustic soda solution and 100 parts of water. 40 parts of 30 per cent formaldehyde solution are then added while stirring and the whole heated for three hours at waterbath temperature. A solution of 30 parts of anhydrous sodium sulphite in 50 parts of 30 per cent formaldehyde solution and 100 parts of water is then added while stirring and the whole further heated for three hours. The reaction product is diluted with water and acidified with 30 parts of formic acid. A homogeneous syrupy turbid red-brown solution is obtained which yields by tanning a pale yellowish leather having a full and compact touch.

Example 5

A solution of 15 parts of anhydrous sodium bisulphite and 15 parts of acetaldehyde in 50 parts of water is added to an alkaline solution of sulphite cellulose waste liquor and cresol DAB VI prepared as described in Example 1. The mixture is heated at 90° centigrade under reflux for three hours with repeated shaking. The reaction product is acidified with 30 parts of formic acid. The acetaldehyde-bisulphite solution may also be replaced by a solution of 15 parts of anhydrous sodium bisulphite and 18 parts of acetone in 50 parts of water, a similar tanning agent being obtained.

Example 6

60 parts of grape sugar are dissolved in 100 parts of water; after adding 10 parts of caustic soda solution, a saturated solution of 15 parts of anhydrous sodium bisulphite in water is stirred in. The resulting solution is added to an alkaline solution of sulphite cellulose waste liquor and cresol DAB VI prepared as described in Example 1 and the mixture heated for three hours at waterbath temperature. The resulting solution is acidified with 40 parts of formic acid.

Example 7

A solution of 15 parts of anhydrous sodium bisulphite and 50 parts of 50 per cent aldol in 75 parts of water is added to an alkaline solution of sulphite cellulose waste liquor and cresol DAB VI prepared according to Example 1. The mixture is heated with repeated stirring for three hours at 90° centigrade. After adding 30 parts of formic acid, the resulting solution may be directly used for tanning.

Example 8

An alkaline solution of sulphite cellulose waste liquor and cresol prepared according to Example 1 is mixed with a solution of 15 parts of anhydrous sodium bisulphite and 36 parts of salicyl aldehyde in 100 parts of water and heated for three hours at waterbath temperature. The resulting solution is acidified with 40 parts of 30 per cent glycollic acid and may be used in this form for tanning.

Example 9

A solution of 75 parts of a neutralized condensation product of cresol sulphonic acid and formaldehyde in 75 parts of water is heated, after the addition of 40 parts of cresol, for half an hour on a waterbath. 200 parts of neutralized sulphite cellulose waste liquor having a specific gravity of about 32° Baumé and 1 part of caustic soda solution of 36° Baumé are then added to the mixture. There is also introduced while stirring a solution of 5 parts of sodium bisulphite powder in 35 parts of 30 per cent formaldehyde. The resulting mixture is heated for three hours at from 95° to 100 centigrade while stirring, diluted with water and acidified with 20 parts of concentrated formic acid. A pale and soft-tanning tanning agent is obtained.

If the formaldehyde condensation product of cresol sulphonic acid be replaced by a solution of 35 parts of the neutralized formaldehyde condensation product of beta naphthalene sulphonic acid, a tanning agent is obtained which yields very pale leather having good stiffness and good plumpness.

Example 10

A mixture of 75 parts of neutralized formaldehyde-cresol sulphonic acid condensation product, 40 parts of cresol, 1 part of caustic soda solution of 36° Baumé strength, 40 parts of 30 per cent formaldehyde, 5 parts of sodium bisulphite and 50 parts of water is heated for three hours at from 95° to 100° centigrade while stirring. A solution of 200 parts of neutralized sulphite cellulose waste liquor of 32° Baumé strength, 20 parts of 30 per cent formaldehyde and 10 parts of sodium bisulphite powder in 30 parts of water is then added and the whole again heated for about three hours at from 95° to 100° centigrade while stirring. The reaction product is acidified with a mixture of 15 parts of concentrated sulphuric acid and about 30 parts of water. A tanning agent is obtained which tans through rapidly and which yields pale leather of good stiffness.

Example 11

A mixture of 60 parts of cresol, 20 parts of neutralized cresol sulphonic acid and 100 parts of water is heated for about half an hour at water-bath temperature. 200 parts of neutralized sulphite cellulose waste liquor of 32° Baumé strength, 1 part of caustic soda solution of 36° Baumé strength and a solution of 10 parts of sodium bisulphite powder in 70 parts of 30 per cent formaldehyde are then added and the whole heated for from 3 to 4 hours at from 95° to 100° centigrade. The reaction product is acidified as described in Example 2 and yields a compact leather of good plumpness.

Example 12

A mixture of 75 parts of neutralized formaldehyde-cresol sulphonic acid condensation product, 40 parts of cresol, 10 parts of 30 per cent formaldehyde, 20 parts of caustic soda solution of 36° Baumé strength and 100 parts of water is heated for an hour at from 90° to 95° centigrade. 200 parts of neutralized sulphite cellulose waste liquor of 32° Baumé strength and a solution of 25 parts of aldol and 5 parts of sodium bisulphite powder in 30 parts of water are then added and the whole heated for three hours at from 95° to 100° centigrade while stirring. The reaction product is acidified with 40 parts of commercial hydrochloric acid. It yields full, soft leather of a yellow-brown colour.

Example 13

A neutralized solution of 30 parts of the condensation product of formaldehyde bisulphite and 4.4'-dihydroxy diphenyl sulphone in 170 parts of water is heated for about half an hour at from 90° to 95° centigrade together with 25 parts of 4.4'-dihydroxy-diphenyl-dimethyl-methane and 4.4 parts of caustic soda solution of 36° Baumé strength. 200 parts of neutralized sulphite cellulose waste liquor of 32° Baumé strength and a solution of 8 parts of sodium bisulphite powder in 35 parts of 30 per cent formaldehyde are then added and the whole heated for about three hours at from 90° to 95° centigrade while stirring. The reaction product is acidified with 25 parts of concentrated formic acid. It yields full, soft leather having a pale colour and a good fastness to light.

What I claim is:

1. The process of producing water-soluble condensation products, which comprises treating in an alkaline medium lignin sulphonic acid and a hydroxy compound of the benzene series with an addition compound of a salt of sulphurous acid and a carbonyl compound selected from the class consisting of the aldehydes, ketones, aldehyde-alcohols, keto-alcohols, aldehyde-acids and keto-acids.

2. The process of producing water-soluble condensation products, which comprises treating in an alkaline medium lignin sulphonic acid and a hydroxy compound of the benzene series with an addition compound of a salt of sulphurous acid and a carbonyl compound selected from the class consisting of the aldehydes, ketones, aldehyde-alcohols, keto-alcohols, aldehyde-acids and keto-acids and furthermore with a sulphonic acid.

3. The process of producing water-soluble condensation products, which comprises treating in an alkaline medium lignin sulphonic acid and a condensation product of a hydroxy compound of the benzene series with formaldehyde with an addition compound of a salt of sulphurous acid and a carbonyl compound selected from the class consisting of the aldehydes, ketones, aldehyde-alcohols, keto-alcohols, aldehyde-acids and keto-acids.

4. The process of producing water soluble condensation products, which comprises treating in an alkaline medium lignin sulphonic acid and a hydroxy compound of the benzene series with an addition compound of an alkali metal salt of sulphurous acid and formaldehyde.

5. The products obtainable according to the process claimed in claim 1.

6. The products obtainable according to the process claimed in claim 2.

7. The products obtainable according to the process claimed in claim 3.

8. The products obtainable according to the process claimed in claim 4.

RICHARD ALLES.